(12) United States Patent
Degelsegger (10) Patent No.: US 6,668,499 B2
(45) Date of Patent: *Dec. 30, 2003

(54) FIRE DOOR OR WINDOW

(75) Inventor: Walter Degelsegger, Desselbrunn (DE)

(73) Assignee: Dorma GmbH + Co. KG, Ennepetal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/813,193

(22) Filed: Mar. 20, 2001

(65) Prior Publication Data

US 2001/0023560 A1 Sep. 27, 2001

Related U.S. Application Data (63) Continuation of application No. PCT/EP00/06884, filed on Jul. 19, 2000.

(30) Foreign Application Priority Data

Jul. 21, 1999 (DE) .......................... 199 33 410

(51) Int. Cl.[7] ............................... E06B 9/01
(52) U.S. Cl. ................... 52/204.62; 52/784.11; 52/786.1; 52/786.11; 52/800.14; 52/232; 49/501
(58) Field of Search .................. 52/784.11, 783.13, 52/232, 92, 337, 235, 784.15, 204.62, 786.1, 786.11, 800.14; 292/92, 337; 49/501, 70

(56) References Cited

U.S. PATENT DOCUMENTS

| | | | | |
|---|---|---|---|---|
| 4,270,326 A | * | 6/1981 | Holter et al. | 52/404 |
| 5,633,090 A | * | 5/1997 | Rodek et al. | 428/428 |
| 5,816,017 A | * | 10/1998 | Hunt et al. | 52/784.11 |
| 5,972,434 A | * | 10/1999 | Kajander | 427/389.8 |
| 6,119,411 A | * | 9/2000 | Mateu Gil et al. | 52/79.1 |
| 6,340,389 B1 | * | 1/2002 | Klus | 106/675 |
| 6,421,968 B2 | * | 7/2002 | Degelsegger | 52/204.62 |

FOREIGN PATENT DOCUMENTS

| | | | |
|---|---|---|---|
| DE | 2713849 | | 10/1977 |
| DE | 2742665 | | 3/1978 |
| DE | 2645259 | | 4/1978 |
| DE | 3530968 | | 3/1987 |
| DE | 3625367 | | 2/1988 |
| DE | 3714629 | | 11/1988 |
| DE | 9420810 | | 6/1996 |
| DE | 19509206 | | 9/1996 |
| DE | 19543148 | | 5/1997 |
| DE | 19626612 | | 9/1997 |
| DE | 19733381 | | 3/1998 |
| EP | 0228641 | * | 12/1986 ............. E06B/3/66 |

(List continued on next page.)

OTHER PUBLICATIONS

Bilco (specialty access products).*
Stoffspezifische Baustofflehre, p. 182.
Kunststoff–Rundschau, Hoft 5, May 1967, p. 48.

*Primary Examiner*—Carl D. Friedman
*Assistant Examiner*—Chi Q. Nguyen
(74) *Attorney, Agent, or Firm*—Nils H. Ljungman & Associates (57) ABSTRACT

Fire door or window, comprised essentially of a glass pane that is embedded in a metal frame that surrounds it, whereby the fire door has a modular construction and thereby is comprised of at least one door panel that is formed by two glass panes that are separated by profiles, whereby the glass panes extend almost to the edge of the door panel and the profiles realized in the form of hollow chamber profiles are connected to form a frame, whereby the frame is covered by a partial enameling of the glass panes, and there can be a transparent fireproofing agent between the separated glass panes.

17 Claims, 4 Drawing Sheets

FOREIGN PATENT DOCUMENTS

| | | |
|---|---|---|
| EP | 0228641 A2 | 7/1987 |
| EP | 0401555 | 12/1990 |
| EP | 0444393 | 9/1991 |
| EP | 0472109 | 2/1992 |
| EP | 0612910 | 8/1994 |
| EP | 0666402 | 8/1995 |
| EP | 1020605 | 7/2000 |
| FR | 2543608 | 10/1984 |
| WO | 9802632 | 1/1998 |

* cited by examiner

FIRE DOOR OR WINDOW

CONTINUING APPLICATION DATA

This application is a Continuation-In-Part application of International Patent Application No. PCT/EP00/060884, filed on Jul. 19, 2000, which claims priority from Federal Republic of Germany Patent Application. No. 199 33 410.2, filed on Jul. 21, 1999. International Application No. PCT/EP00/06884 was pending as of the filing date of this application. The United States was an elected state in International Application No. PCT/EP00/06884.

BACKGROUND OF THE INVENTION

1. Field of the Invention

This invention relates to a fire door or window to prevent smoke and/or fire from skipping from one fire compartment to another, which door or window is installed in a area of a fire compartment and consists essentially of a glass pane that is embedded in a surrounding metal frame, that consists essentially of a glass pane embedded in a metal frame that surrounds it, and to keep smoke and fire inside a fire compartment from skipping to other areas.

2. Background of the Invention

A fire door of this type is described, for example, in European Patent 0 401 555 A2, where a glass pane is inserted inside a metal frame that has a surrounding receptacle groove. The glass panel thereby ends before it reaches the frame and is connected to the metal frame by additional metal edge strips that are fastened to the glass pane and function as adapters. The metal strips are thereby connected using a conventional fireproof adhesive, e.g. one based on water glass.

European Patent 0 612 901 A2 describes an edge strip for metal doors which is impressed in the lower portion of the door between two projecting legs to increase stability A frame profile for fire doors is described in European Patent 0 444 393 A2, in which a glass pane is held in place by a strong frame profile. The frame profile is realized in the form of a hollow chamber or cellular profile and has fireproof or fire-resistant plates inserted into the chambers to guarantee the fire resistance of such a door.

A fire-resistant glazing is described in German Patent 26 45 259 A1. Silicate glass panes made of pre-stressed glass are used on the one side of an air gap between the two panes, and a reinforced silicate glass pane is used on the other side. The construction of a fire-resistant glazing of this type is achieved by a metal frame that borders and covers or overlaps these panes on the edges.

German Patent 27 42 665 A1 shows a fire-resistant swinging door in which the door frame or the edges of the panels have a thermal insulation material that extends over the entire length or width. This thermal insulation material swells under the effect of heat, so that in the event of a tire, the element automatically creates a secure barrier against the fire. This door consists of a sheet material that is not transparent and is interrupted in one portion by an inserted window.

As is apparent from the prior art described above, constructions of the type described above are no longer ideally suited to contemporary architecture and construction techniques. The current trend is to convey to the observer the impression that the structures are dematerialized and transparent, an impression that can no longer be achieved with the constructions described by the prior art.

OBJECT OF THE INVENTION

The object of the invention is to create a fire door or a fire window that is suitable for use in modern architectural designs with glass elements that do not disrupt the overall appearance, and can be used in the widest possible range of applications.

SUMMARY OF THE INVENTION

The invention teaches that this object can be accomplished by a fire door/window that has a modular construction and thereby consists of at least one movable part in the form of a door panel or window panel, which is formed by two glass panes that are separated by profiles, whereby the glass panes extend almost to the edge of the door panel or window panel, and the profiles realize in the form of hollow-chamber profiles are connected into a frame, whereby the frame is covered by a partial enameling of the glass panes. Further features of the invention are described herein. The invention teaches that the fire door or the fire window thereby has a modular construction. The description presented below refers to a fire door, although the teaching of the invention applies equally to fire windows. By creating a basic body for a fire door, the widest possible variety of types of doors, such as swinging doors, doors with stops etc. can be created without any additional effort. The fire door thereby consists of a door panel that is formed between two glass panels that are at some distance from each other, whereby the glass panels extend almost to the edge of the door panel. The profiles are thereby realized in the form of hollow chambers profiles and are connected by means of corner connectors to form a frame. However, the frame is not exposed and is not visible from the outside because it is located in the inner area, i.e. between the separated glass panes, and in the vicinity of the profile, the glass panes cover this area of the profile with enameling. The space inside the door panel, that is, the space between the encircling frame and the separated glass panes, is filled by a transparent fireproofing agent. Depending on the type of application, it is also possible to omit the transparent liquid fireproofing agent, or in a higher fire protection class to insert a special fireproof pane in the gap. As a result of this configuration, a transparent door is created that allows the user to see through it, to a certain extent, even in the event of a fire, and thus shows, for example, that a fire has broken out on the other side of such a door.

The profile for the frame is always the same profile for the piece on the longitudinal sides and on the transverse sides, and has at least one cavity, whereby a cavity has an opening or depression toward the outside, the purpose of which is to make possible the connection of additional profiles. The profile of the concealed frame has projections that cover or overlap the edges of the glass panes used, whereby the edges of the glass panels have a recess so that they can hold an additional profile which functions as an edge or cover profile. This edge profile is pressed into the opening or the groove of the first hollow chamber of the surrounding profile, and thus essentially securely covers the terminal area of the glass panes with its projections. In its center area, the edge profile has a T-groove that can hold seal elements. The curve of the edge profile in the outer area has a crowned or spherical external contour on a door with a stop, although other realizations are conceivable. Fireproof laminates, sheets, or plates can also be integrated into this external contour. In the event of a fire, the fireproof laminates are designed to swell as a result of the elevated temperature and thus guarantee a sealing of the door panel against the surrounding door frame.

A fire door of the type claimed by the invention can thus be prefabricated from a concealed surrounding frame and two glass panes made of single-pane safety glass. If, in addition to the realization or the door with an edge profile as described above, the door is to be used in a different application, for example as a door that has a stop, a profile with a different configuration can be used which is then inserted into the opening of the hollow chamber and also covers the edges of the glass panes, but also has a deflecting leg that acts as a stop for the door panel in the door frame.

It is also conceivable, however, that the stop leg is not molded or shaped onto the door directly, but that an additional profile is used that, in its external area, has at least one and preferably two T-grooves, whereby a seal can be introduced into one of the T-grooves and an appropriately shaped stop profile can be introduced into a second T-groove.

The profiles used can be made of plastic or light alloy. Appropriate hardware or fittings are thereby introduced inside the profiles to guarantee the proper and smooth operation of a fire door of this type. Door panels of this type can be realized both as single-panel and as double-panel side-hung pivoting or casement doors, or as swinging doors.

The above-discussed embodiments of the present invention will be described further hereinbelow. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these invention may be patentable and non-obvious one with respect to the other.

BRIEF DESCRIPTION OF THE DRAWINGS

Hereinafter, the invention is explained on the basis of different diagrammatically represented embodiment examples. They show.

DESCRIPTION OF THE PREFERRED EMBODIMENT

Figure 1:
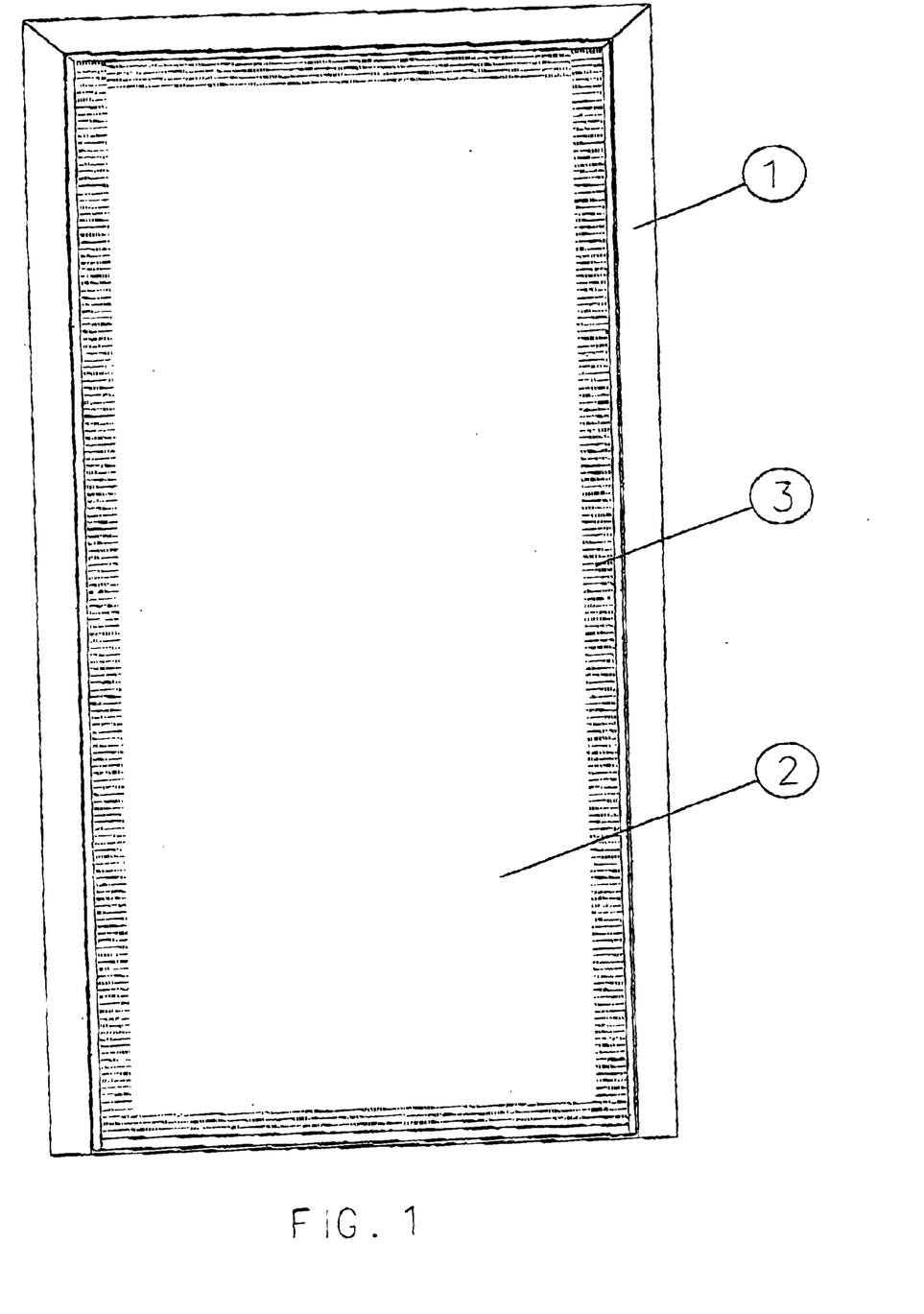
FIG. 1: is a front view of a closed fire door.

FIG. 1 shows a fire door that has a door panel 2 inside a door casing 1, whereby the door panel 2 is visible from the outside. A door of this type is shown in vertical section by way of the example in FIG. 2. Between the upper area of the door casing 1, in which a seal 4 in the form of a fireproof laminate is inserted, the sectional drawing shows a door panel 2 in a bottom door bearing 24 above an entrance threshold 21 of a floor. The basic structure of the door panel 2 consists essentially of two glass panes 5 and 6 that are held by an invisible frame that is formed by a profile 9. The profile 9 is assembled into a frame by means of corner connectors or brackets (not shown). Inside the frame, between the glass panes 5 and 6, a fireproof filling 25, e.g. in the form of a fireproof gel, is introduced in the remaining space.

Figure 4:
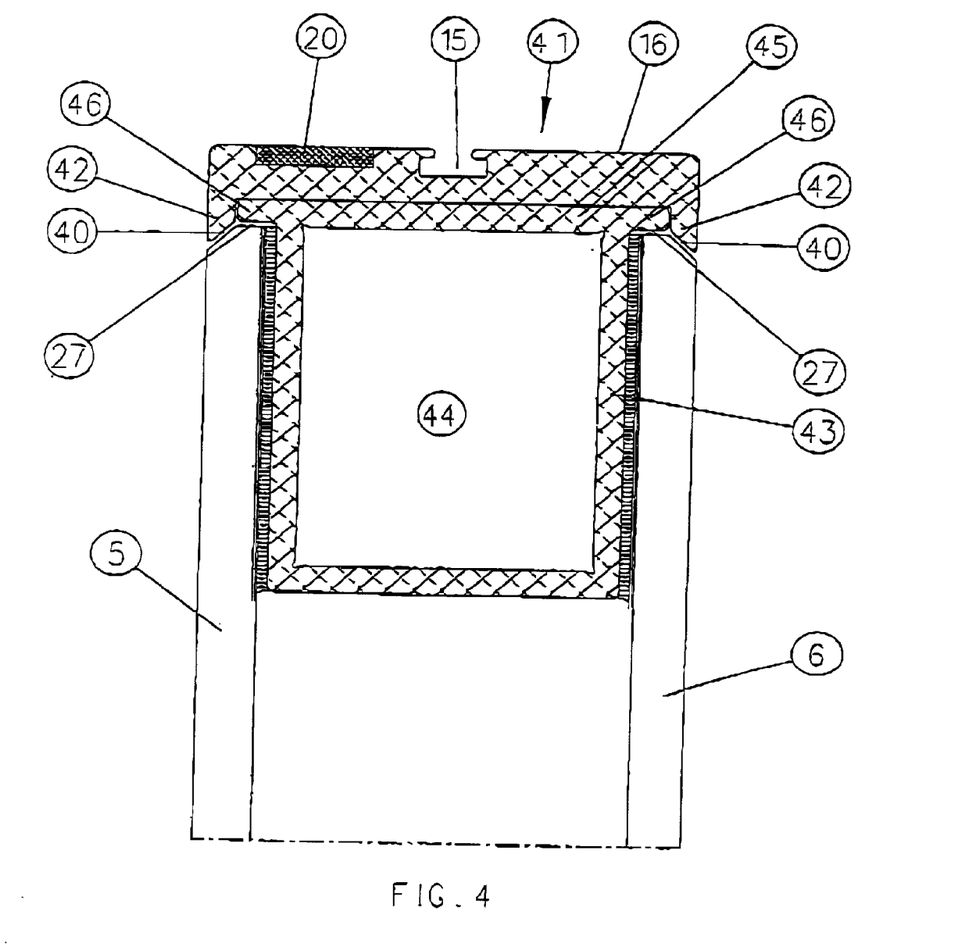
FIG. 4: same as FIG. 3, but with a different profile.

The profile 9 consists essentially of two hollow chambers, cells, or cavities 10 and 14, whereby the hollow chamber 10 is realized in the form of a closed chamber, and the hollow chamber 14 is realized in the form of an open chamber with a opening 19 that is realized on the outer edge of the frame. Inside the cavity 14 there is a recess 12 which is used for the further connections or fixing in position of additional profiles that are introduced through the opening 19. The profile 9 has, on the outside, in which there is also the opening 19, projections or protrusions 38 on each side that point toward the glass panes. The projections 38 thereby overlap or cover the edges 27 of the glass panes 5 and 6. In this area, the glass panes 5 and 6 have a recess 7 with respect to their outside surface. Instead of the recess 7, the glass panes 5, 6 can also be provided with only a bevel, as shown in FIG. 4. In the area where the profiles 9 lie behind the glass panes 5 and 6, the glass panes 5 and 6 are provided with enameling 3. Consequently, the frame is invisible to the observer or the user of such a fire door. In the exemplary embodiment illustrated in FIG. 2, the edge profile 17 is introduced into the opening 19 of the profile both on the upper side and on the lower side. The edge profile 17 has a projection or protrusion 18 that holds the edge profile 17 inside the opening 19. The external contour 16 of the edge profile 17 runs in the form of a radius and ends on both sides in projecting legs 8 that engage in the recess 7 of the glass panes 5 and 6 and thus completely cover the edges 27 of the glass panes. The external contour 16 of the edge profile 17 is interrupted in the center area by a T-groove 15. A seal 39, for example, can be inserted in the T-groove 15. Moreover, running on both sides of the T-groove 15 are depressions 21 that are filled with fireproof laminates in the form of swelling strips 20. These fireproof laminates essentially guarantee that, in the event of a fire, and specifically am a result of the heat generated by the fire, the strips will swell and the door will essentially securely seal off the fire compartment.

Figure 2:
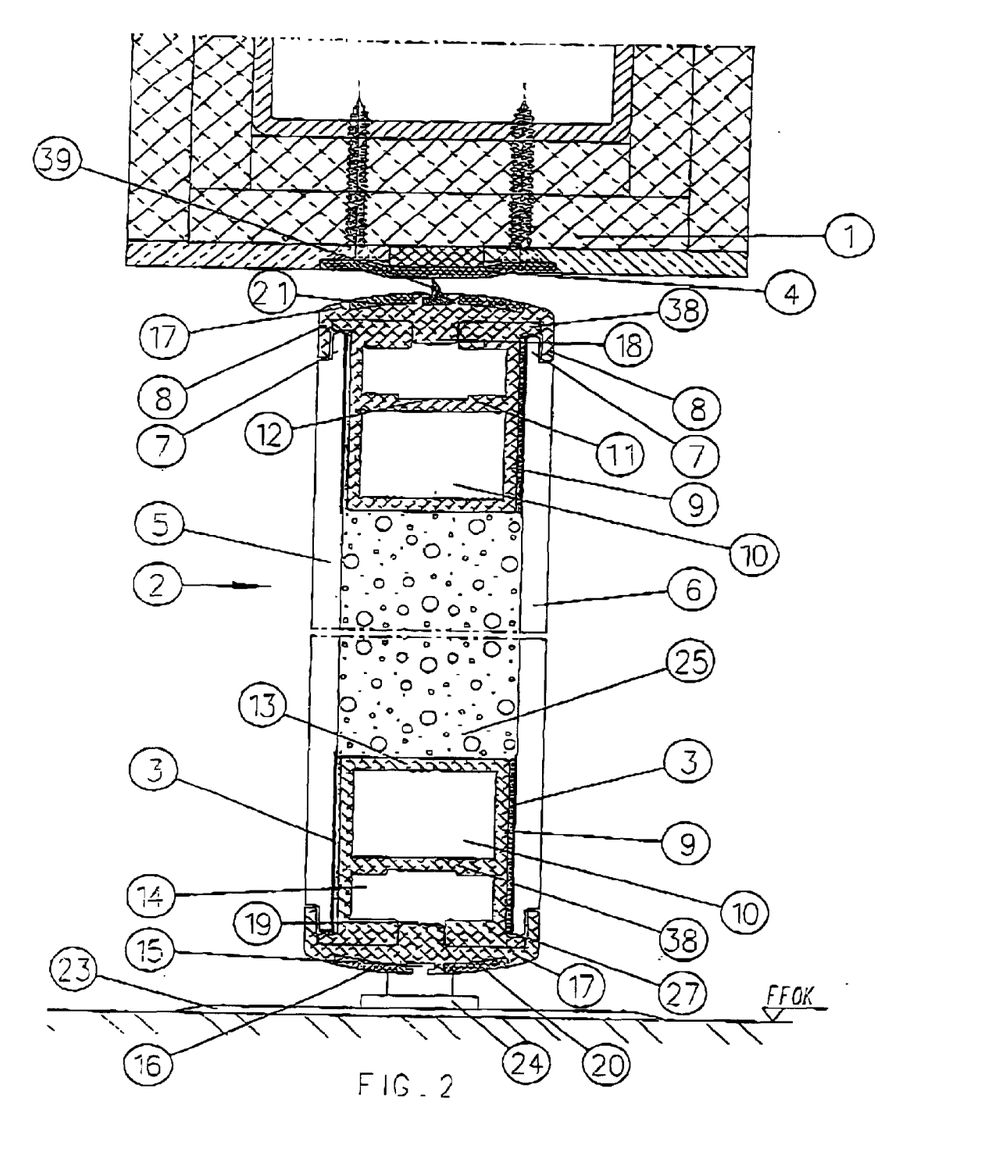
FIG. 2: is a vertical section through a fire door as shown in FIG. 1.
Figure 3:
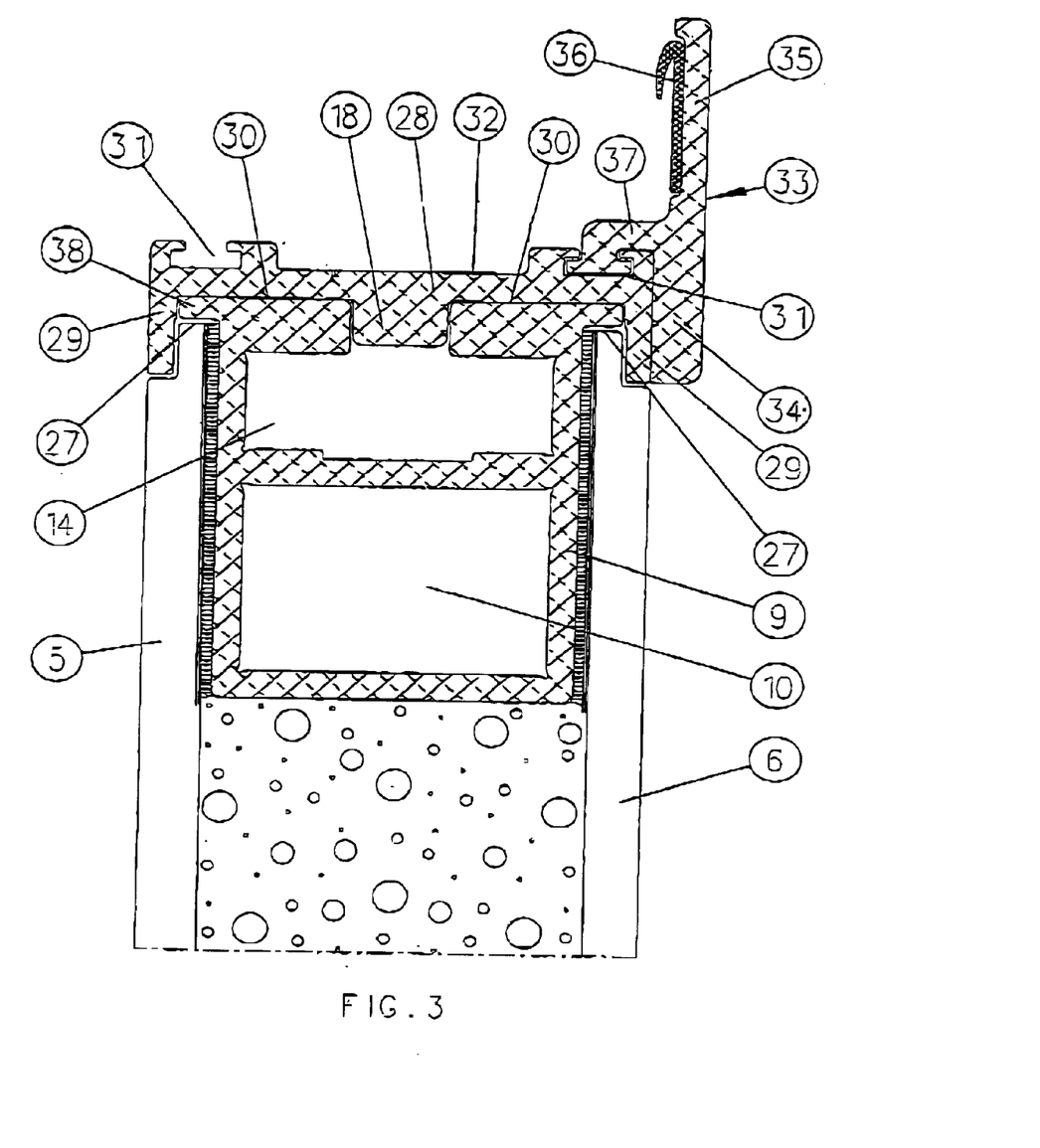
FIG. 3: is a cross section through a portion of the peripheral area with a variety of different profiles.

The exemplary embodiment illustrated in FIG. 2 shows a door that can be used, for example, in the form of a swinging door. However, and as illustrated in FIG. 3, a door with a stop can also be made out of the basic body of the door panel 2, namely the glass panes 5 and 6 with the frame consisting of the profile 9 between them. For this purpose, for example, a profile 28 with a projection 18 is inserted into the opening 19. This profile 28 also has, in its outer area, legs 29 that fill up the recesses 7 of the glass panes 5 and 6. With respect to the projection 30, the profile 28 has two recesses 30 that come into contact with the outer contour of the profile 9. In the outer contour of the profile 38, there are also two T-grooves, preferably on the edges. A seal element, for example, can be inserted into this T-groove, as can a stop profile 33. These inserted profiles can also be made of other materials. The stop profile 33 is realized so that it has a leg 34 that runs parallel to the glass pane 6. This leg 34 makes a transition into a leg 35 that has a smaller cross section than the leg 34. In the vicinity of the transition from the leg 34 into the leg 35 there is a leg 37 that is bent at a right angle and has a T-shaped extension in its terminal area. This T-shaped extension is inserted into the T-groove 31. A seal 36 can also be attached to the leg 35. As a result of this rapid connection of the profiles 28 and 33, it is thereby possible to make a door with a stop out of the basic body of the fire door on account of the modular system used. A recess 32 runs between the two T-grooves, in the outer area of the profile 28, which recess can be used, for example, to introduce a swell strip in the form of a fireproof laminate.

FIG. 4 shows an exemplary embodiment that is equipped with only one hollow chamber 44. An outer boundary leg 45 has lateral projections 46 that cover the edges 27 of the glass panes. In this embodiment, the glass panes 5, 6 are provided with a beveled edge 40. In the exemplary embodiment illustrated in FIG. 4, an edge profile is connected by means of the boundary leg 45. The edge profile 41 is realized in the shape of a U, whereby two deflecting legs 42 extend to the beveled edges 40 of the glass panes 5, 6. In the center of the outer contour 16 there is a T-groove 15, and a fireproof laminate is integrated laterally. Depending on the fire protection class, the gap between the separated glass panes 5, 6 can be filled with a fireproofing agent, e.g. fireproof gel or fireproof glass, although it does not need to be filled with a fireproofing agent. Likewise, the profiles 9, 43 can be filled or not filled.

The profiles 9, 17, 28, 41 and 53 can be made of plastic, steel, wood or light alloy. When plastic is used, it should be a fiberglass-reinforced plastic.

One feature of the invention resides broadly in a fire door or window to prevent smoke and/or fire from skipping from one fire compartment to another, which door or window is installed in an area of a fire compartment and consists essentially of a glass pane that is embedded in a surrounding metal frame, characterized by the fact that the fire door/window has a modular construction and thereby consists of at least one movable part in the form of a door panel 2 or window panel, which is formed by two glass panes (5, 6) that are separated by profiles (9, 43), whereby the glass panes (5, 6) extend almost to the edge of the door panel (2) or window panel, and the profiles (9, 43) realized in the form of hollow-chamber profiles are connected into a frame, whereby the frame is covered by a partial enameling (3) or the glass panes (5, 6).

Another feature of the invention resides broadly in a fire door or window characterized by the fact that there is a transparent fireproofing agent (25) between the separated glass panes (5, 6).

Yet another feature of the invention resides broadly in a fire door or window characterized by the fact that the profile (9) is provided with at least two cavities (10, 26), whereby the cavity (10) has a opening (19) or depression that is suitable for the connection of additional profiles.

Still another feature of the invention resides broadly in a fire door or window characterized by the fact that the profile (9) has projections (38) that cover the edges (27) of the glass panes (5) and (6).

A further feature of the invention resides broadly in a fire door or window characterized by the fact that the glass panes (5, 6), in the vicinity of the edges (27) of the glass panes, have recesses (7) that are filled by legs (8) of an edge profile (17).

Another feature of the invention resides broadly in a fire door or window characterized by the fact that the glass panes (5, 6) have beveled edges (40) in the vicinity of the edges (27) of the glass panes, which beveled edges (40) are covered by legs (42) of an edge profile (41).

Yet another feature of the invention resides broadly in a fire door or window characterized by the fact that the edge profiles (17, 41) have a crown, spherical, curved or straight external contour.

Still another feature of the invention resides broadly in a fire door or window characterized by the fact that the external contour of the edge profiles (17, 41) is interrupted by a T-groove (15).

A further feature of the invention resides broadly in a fire door or window characterized by the fact that a seal (39) is inserted in the T-groove (15).

Another feature of the invention resides broadly in a fire door or window characterized by the fact that fireproof laminates (20) are integrated into the external contour (16).

Yet another feature of the invention resides broadly in a fire door or window characterized by the fact that the profile (43), which has a hollow chamber (44),g is equipped with an outer boundary leg (45), which has projections (46) that cover all or part of the edges (27) of the glass panes.

Still another feature of the invention resides broadly in a fire door or window characterized by the fact that a profile (28) can be connected by means of the opening (19) of the profile (9).

A further feature of the invention resides broadly in a fire door or window characterized by the fact that on the profile (28) there are legs (29) that cover the recesses (7) of the edges (27) of the glass panes.

Another feature of the invention resides broadly in a fire door or window characterized by the fact that there are T-grooves (31) in the outer contour of the profile (28).

Yet another feature of the invention resides broadly in a fire door or window characterized by the fact that a stop profile (33) is inserted in the T-groove (28).

Still another feature of the invention resides broadly in a fire door or window characterized by the fact that a seal is inserted in the T-groove (28).

A further feature of the invention resides broadly in a fire door or window characterized by the fact that the profiles (9, 17, 28, 41, 43) are made of plastic, steel, wood or light alloy.

Another feature of the invention resides broadly in a fire door or window characterized by the fact that the plastic is a fiberglass-reinforced plastic.

Yet another feature of the invention resides broadly in a fire door or window characterized by the fact that hardware or fittings can be installed inside the profiles (9, 43).

Still another feature of the invention resides broadly in a fire door or window characterized by the fact that the door panel (2) is a single-panel or double-panel side-hung swinging door.

A further feature of the invention resides broadly in a fire door or window characterized by the fact that the door panel (2) is a single-panel or double-panel swinging door.

Another feature of the invention resides broadly in a fire door or window characterized by the fact that the glass panes (5, 6) are made of a safety glass.

Yet another feature of the invention resides broadly in a fire door or window characterized by the fact that the frame is filled with a fireproofing agent (25).

Still another feature of the invention resides broadly in a fire door or window characterized by the fact that the fireproofing agent (25) is a fireproofing gel.

The components disclosed in the various publications, disclosed or incorporated by reference herein, may be used in the embodiment of the present invention, as well as equivalents thereof.

The appended drawings in their entirety, including all dimension, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are entirety herein.

The corresponding foreign and international patent publication applications, namely, Federal Republic of Germany Patent Application No. 199 33 410.2, filed on Jul. 21, 1999, having inventor Walter Degelsegger, and International Application No. PCT/EP00/06884, filed on Jul. 19, 2000, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

U.S. patent application Ser. No. 09/813,186, filed on Mar. 20, 2001, having the inventor Walter DEGELSEGGER, with Attorney Docket No. NHL-DOR-88, and claiming priority from Federal Republic of Germany Patent Application No. 199 33 400.5, which was filed on Jul. 21, 1999 and International Patent Application PCT/EP00/06898, which was filed an Jul. 19, 2000 as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

U.S. patent application Ser. No. 09/812,424, filed on Mar. 20, 2001, having the inventor Walter DEGELSEGGER, with Attorney Docket No. NHL-DOR-89, and claiming priority from Federal Republic of Germany Patent Application No. 199 33 406.4, which was filed on Jul. 21, 1999 and International Patent Application PCT/EP00/06886, which was filed on Jul. 19, 2000 as well as their published equivalents, and other equivalent or corresponding applications, if any, in corresponding case in the Federal Republic of Germany and elsewhere, and the references cited in any of the documents cited herein, are hereby incorporated by reference as if set forth in their entirety herein.

U.S. patent application Ser. No. 09/812,974, filed on Mar. 20, 2001, having the inventor Walter DEGELSEGGER, with Attorney Docket No. NHL-DOR-90, and claiming priority from Federal Republic of Germany Patent Application No. 199 33 408.0 which was filed on Jul. 21, 1999 and International Patent Application PCT/EP00/06893, which was filed on Jul. 19, 2000 as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The following standards or codes, namely: ASTM D 523 entitled "Standard Test Method for Specular Gloss"; ASTM D635 entitled "Standard Test Method for Rate of Burning and/or Extent of and Time of Burning of Self-supporting Plastics in a Horizontal Position"; ASTM E 84 entitled "Standard Test Method for Surface Burning Characteristics of Building Materials"; ASTM E 152 entitled "Standard Methods of Fire Tests of Door Assemblies"; NFPA 252 entitled "Standard Methods of Fire Tests of Door Assemblies"; and UL 10B entitled "Standard for Fire Tests of Door Assemblies", are hereby incorporated by reference as if set forth in their entirety herein.

The terms fire rated, fire resistant, fire protection, and flame retardant are used herein interchangeably.

The terms fire protection laminate or the like terminology is to mean, inter alia, a seal or similar structure made of intumescent material that expands in the event of a predetermined temperature or heat of fire. This expanded structure will then serve to seal off the space of a corresponding gap, say between a door jamb and a door leaf, to thereby enhance the fire rated capability of the fire rated door, and a fire rated window.

Some examples of fire resistant plastic, or polymeric or synthetic, materials which may possibly be incorporated in an embodiment of the present invention are to be found in: U.S. Pat. No. 4,017,457 issued to Baron et al. on Apr. 12, 1977 and entitled "Flame retardant polycarbonate compositions"; U.S. Pat. No. 4,035,447 issued to Tonoki et al. on Jul. 12, 1977 and entitled "Fire resistant polymer composition"; U.S. Pat. No. 4,101,498 issued to Snyder on Jul. 18, 1978 and entitled "Fire-resistant compositions"; U.S. Pat. No. 5,444,809 issued to Aoki et al. on Aug. 22, 1995 and entitled "Flame retardant resin composition and flame retardant plastic optical fiber cable using the same"; U.S. Pat. No. 4,119,612 issued to Vollkommer et al. on Oct. 10, 1978 and entitled "Polymeric and oligomeric formals"; U.S. Pat. No. 4,650,823 issued to Krishnan et al. on Mar. 17, 1987 and entitled "Iron oxide pigmented, polycarbonate composition"; U.S. Pat. No. 5,276,077 issued to Schwane et al. on Jan. 4, 1994 and entitled "Ignition resistant carbonate polymer blends"; U.S. Pat. No. 5,298,299 issued to Shea on Mar. 29, 1994 and entitled "Double wall fire proof duct"; U.S. Pat. No. 5,326,805 issued to Sicken et al. on Jul. 5, 1994 and entitled "Flame-retardant plastics molding composition of improved stability"; U.S. Pat. No. 5,329,972 issued to Guiton on Jul. 19, 1994 and entitled "Fire resistant plastic structure"U.S. Pat. No. 5,444,809 issued to Aoki et al. on Aug. 22, 1995 and entitled "Flame retardant resia composition and flame retardant plastic optical fiber cable using the same"; U.S. Pat. No. 5,571,888 issued to Cheng et al. on Nov. 5, 1996 and entitled "Process for preparing flame-retardant phosphorous-containing unsaturated polyester"; and U.S. Pat. No. 6,110,559 issued to De Keyser on Aug. 29, 2000 and entitled "Plastic article having flame retardant properties", all of these U.S. patents being hereby expressly incorporated by reference as if set forth in their entirety herein.

Some examples of fire resistant materials which possibly may be incorporated in an embodiment of the present invention are to be found in: U.S. Pat. No. 3,983,082 issued to Pratt et al. on Sep. 28, 1976 and entitled "Intumescent fire retardant material and article"; U.S. Pat. No. 4,052,526 issued to Pratt et al. on Oct. 4, 1977 and entitled "Intumescent fire retardant material and article"; U.S. Pat. No. 4,065,394 issued to Pratt et al. on Dec. 27, 1977 and entitled "Intumescent fire retardant material"; U.S. Pat. No. 4,235,836 issued to Wassell et al. on Nov. 25, 1980 and entitled "Method for making thermal insulating, fire resistant material"; U.S. Pat. No. 4,246,358 issued to Ellard on Jan. 20, 1981 and entitled "Fire-resistant material and process"; U.S. Pat. No. 4,265,317 issued to Knecht on May 5, 1981 and entitled "Fire resistant material"; U.S. Pat. No. 4,810,741 issued to Kim and entitled "Fire-resistant material, noncombustible material for treating interior building material and processes for their production"; U.S. Pat. No. 5,401,793 issued to Kobayashi et al. on Mar. 28, 1995 and entitled "Intumescent fire-resistant coating, fire-resistant material, and processes for producing the fire-resistant material"; U.S. Pat. No. 6,001,285 issued to Wunram on Dec. 14, 1999 and entitled "Fire-retardant material and a method for the manufacture of such a material"; and U.S. Pat. No. 6,159,878 issued to Marsh on Dec. 12, 2000 and entitled "Layered reflecting and photoluminous fire resistant material", all of these U.S. patents being hereby expressly incorporated by reference as if set forth in their entirety herein.

Some examples of fire retardant fillers which possibly may be incorporated in an embodiment of the present invention are to be found in: U.S. Pat. No. 4,254,177 issued to Fulmer on Mar. 3, 1981 and entitled "Fire-retardant product and method of making"; U.S. Pat. No. 4,391,924 issued to Uram, Jr. on Jul. 5, 1983 and entitled "High temperature thermobarrier compositions"; U.S. Pat. No. 4,619,954 issued to Warner, II on Oct. 28, 1986 and entitled "Fiberglass reinforced plastic sheet material with fire retardant filler"; U.S. Pat. No. 4,746,565 issued to Bafford et al. on May 24, 1988 and entitled "Fire barrier fabrics"; U.S. Pat. No. 4,839,222 issued to Jain on Jun. 13, 1989 and entitled "Fiberglass insulation coated with a heat collapsible foam composition"; U.S. Pat. No. 5,039,718 issued to Ashley et al. on Aug. 13, 1991 and entitled "Fillers"; U.S. Pat. No. 5,279,894 issued to Hoffman et al. on Jan. 18, 1994 and entitled "Curable silicone compositions and non-flammable cured products obtained therefrom"; U.S. Pat. No. 5,378 issued to Chen on Jan. 3, 1998 and entitled "Cross-linked melt processible fire-retardant ethylene polymer compositions"; U.S. Pat. No. 5,474,602 issued to Brown et al. on Dec. 12, 1995 and entitled "Treatment of magnesium hydroxide and its use as plastics filler"; and U.S. Pat. No. 6,100,359 issued to Ghatan on Aug. 8, 2000 and entitled "Ablative polyurea foam and prepolymer", all of these U.S. patents being hereby expressly incorporated by reference as if set forth in their entirety herein.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirely herein.

All of the patents, patent applications or patent publications, which were cited in the PCT Search Report dated Nov. 10, 2000, and/or cited elsewhere are hereby incorporated by reference as if set forth in their entirety herein as follows: German Patent No. 197 33 381 A to GEZE GMBH & CO, Mar. 26, 1998; German Patent No. 195 43 148 A to FEWA GLASTECHNIK GMBH, May 22, 1997; German Patent No. 196 26 612 A to PILKINGTON GLASS LTD., Sep. 4, 1997; European Patent No. 0 228 641 A to FRATTI, Marco, Jul. 15, 1987; French Patent No. 2 543 608 A to MONDON, Charles, Oct. 5, 1987; WO 98 02632 A to WOSCHKO DONAT., Jan. 22, 1998; German Patent No. 37 14 629 to HENKENJOHANN, Johan, Nov. 17, 1988; European Patent No. 0 472 109 to GARTNER & CO. J., Feb. 26, 1992; European Patent No. 1 020 605 to GEZE GLAS DESIGN GMBH, Mar. 7, 1999.

The details in the patents, patent applications and publications may be considered to be incorporable, at applicant's option, into the claims during prosecution as further limitations in the claims to patentably distinguish any amended claims from any applied prior art.

Some examples of fire rated gels which may possibly be incorporated in an embodiment of the present invention may be found in: U.S. Pat. No. 5,885,713 issued to von Bonin, et al. on Mar. 23, 1999 a entitled "Fire-resistant glass containing a gel with improved melting resistance, and process for the preparation thereof"; U.S. Pat. No. 5,653,839 issued to Itoh, et al. an Aug. 5, 1997 and entitled "Fire-resistant glass and process for production thereof"; U.S. Pat. No. 5,624,998 issued to Itoh, et al. on Apr. 29, 1997 and entitled "Hardenable composition, aqueous gel and applications"; U.S. Pat. No. 5,519,088 issued to Itoh, et al. on May 21, 1996 and entitled "Hardenable composition, aqueous gel and applications thereof"; U.S. Pat. No. 5,496,640 issued to Bolton, et al. on Mar. 5, 1996 and entitled "Fire resistant transparent laminates" U.S. Pat. No. 5,217,764 issued to Eich on Jun 8, 1993 and entitled "Fire protection glazing", all of these U.S. patents being hereby expressly incorporated by reference herein.

Some examples of transparent fire protection which may possibly be incorporated in an embodiment of the present invention may be found in: U.S. Pat. No. 5,462,805 issued to Sakamoto, et al. on Oct. 31, 1995 and entitled "Fire-protection and safety glass panel"; U.S. Pat. No. 5,425,901 issued to von Bonin, et al. on Jun. 20, 1995 and entitled "Fireproofing gels, processes for their preparation and their use, in particular for fireproof glazing"; U.S. Pat. No. 5,230,954 issued to Sakamoto, et al. on Jul. 27, 1993 and entitled "Fire-protection and safety composite glass panel"; U.S. Pat. No. 5,217,764 issued to Eich on Jun. 8, 1993 and entitled "Fire protection glazing"; U.S. Pat. No. 6,159,606 issued to Gelderie, et al. on Dec. 12, 2000 and entitled "Fire-resistant glazing panel"; U.S. Pat. No. 5,543,230 issued to von Bonin, et al. on Aug. 6, 1996 and entitled "Laminated glass construction having an intermediate layer of a fire-proofing gel"; U.S. Pat. No. 4,873,146 issued to Toussaint, et al. Oct. 10, 1989 and entitled "Transparent fire-screening panels", all of these U.S. patents being hereby expressly incorporated by reference herein.

An example of fire rated glass which may possibly be incorporated in an embodiment of the present invention may be found in: U.S. Pat. No. 5,910,620 issued to O'Keeffe, et al. on Jun. 8, 1999 and entitled "Fire-rated glass and method for making same", this U.S. patent being hereby expressly incorporated by reference herein.

Some examples of fire protection glass panes which may possibly be incorporated in an embodiment of the present invention may be found in: U.S. Pat. No. 5,380,569 issued to Kujas, et al. on Jan. 10, 1995 and entitled "Fire resistant glass partition"; U.S. Pat. No. 5,776,844 issued to Koch, et al. Jul. 7, 1998 and entitled "Compositions of silico-sodo-calcic glasses and their applications"; U.S. Pat. No. 5,958, 812 issued to Koch, et al. Sep. 28, 1999 and entitled "Compositions of silico-sodo-calcic glasses and their applications"; U.S. Pat. No. 5,628,155 issued to Nolte, et al. May 13, 1997 and entitled "Fire-resistant structural component with glass pane", all of these U.S. patents being hereby expressly incorporated by reference herein.

Some examples of enameling which may possibly be incorporated in an embodiment of the present invention may be found in: U.S. Pat. No. 6,043,171 issued to Siebers, et al. on Mar. 28, 2000 and entitled "Lead-free and cadmium-free glass compositions for glazing, enameling and decorating glass of glass-ceramics"; U.S. Pat. No. 5,782,999 issued to Kostrubanic on Jul. 21, 1998 and entitled "Steel for enameling and method of making it"; U.S. Pat. No. 5,633,090 issued to Rodek, et al. on May 27, 1997 and entitled "Lead-and cadmium-free glass composition for glaring, enameling and decorating glass", all of these U.S. patents being hereby expressly incorporated by reference herein.

Some examples of fire rated doors which may possibly be incorporated in an embodiment of the present invention may be found in: U.S. Pat. No. 4,748,771 issued to Lehnert, et al.

on Jun. 7, 1988 and entitled "Fire door"; U.S. Pat. No. 4,165,591 issued to Fitzgibbon on Aug. 28, 1979 and entitled "Component type building construction system"; U.S. Pat. No. 5,943,824 issued to Tatara on Aug. 31, 1999 and entitled "Fire rated, hinged, swinging door"; U.S. Pat. No. 6,183,023 issued to Yulkowski on Feb. 6, 2001 and entitled "Door with integrated fire exit device"; U.S. Pat. No. 5,896,907 issued to Dever, et al. on Apr. 27, 1999 and entitled "Rolling fire door including a door hold-open/release system"; U.S. Pat. No. 5,886,637 issued to Stuckey on Mar. 23, 1999 and entitled "Door with built-in smoke and fire detector"; U.S. Pat. No. 5,850,865 issued to Hsieh on Dec. 22, 1998 and entitled "Rolling fire door with delayed closing mechanism"; U.S. Pat. No. 5,565,274 issued to Perrone, Jr., et al. on Oct. 15, 1996 and entitled "Fire rated floor door and control system", all of these U.S. patents being hereby expressly incorporated by reference herein.

Some examples of glass fiber reinforced plastic which may possibly be incorporated in an embodiment of the present invention may be found in: U.S. Pat. No. 5,868,080 issued to Wyler, et al. on Feb. 9, 1999 and entitled "Reinforced plastic pallets and methods of fabrication"; U.S. Pat. No. 5,634,847 issued to Shea on Jun. 3, 1997 and entitled "Fire Retardant reinforced plastic duct system"; U.S. Pat. No 5,448,869 issued to Unruh, et al. on Sep. 12, 1995 and entitled "Composite framing member and window or door assembly incorporating a composite framing member", U.S. Pat. No. 5,446,250 issued to Oka on Aug. 29, 1995 and entitled "Fiberglass reinforced plastic damping material"; U.S. Pat. No. 4,619,954 issued to Warner, II on Oct. 28, 1986 and entitled "Fiberglass reinforced plastic sheet material with fire retardant filler"; U.S. Pat. No. 4,676,041 issued to Ford on Jun. 30, 1987 and entitled "Corrosion-resistant door and its method of manufacture", all of these U.S. patents being hereby expressly incorporated by reference herein.

The invention as described hereinabove in the context of the preferred embodiments is not to be taken as limited to all of the provided details thereof, since modifications and variations thereof may be made without departing from the spirit and scope of the invention.

Nomenclature
1 Door frame
2 Door panel
3 Enamel
4 Seal
5 Glass pane
6 Glass pane
7 Recess
8 Leg
9 Profile
10 Cavity
11 Partition
12 Recess
13 Outside wall
14 Cavity
15 T-groove
16 Outer contour
17 Edge profile
18 Projection
19 Opening
20 Swelling strip (fireproof laminate)
21 Depression
23 Entrance threshold
24 Door bearing
25 Fireproof filling
27 Glass pane edges
28 Profile
29 Leg
30 Recess
31 T-groove
32 Recess
33 Stop profile
34 Leg
35 Leg
36 Seal
37 Leg
38 Projection
39 Seal
40 Beveled edge
41 Edge profile
42 Leg
43 Profile
44 Hollow chamber
45 Boundary leg
46 Projection

What is claimed is:
1. A fire rated door assembly comprising:
a door jamb;
said door jamb comprising a material to provide said door jamb with a fire rating and thus with the capability to withstand fire for a predetermined time with a predetermined fire temperature on a fire exposed side of said door jamb;
a door panel;
said door panel being configured to be mounted at said door jamb and to open and to close;
said door panel being configured with a peripheral portion adjacent to said jamb and a floor, and a central portion;
said peripheral portion of said door panel comprising peripheral edges adjacent to said door jamb;
said door panel comprising a material to provide said door panel with a fire rating and thus with the capability to withstand fire for a predetermined time with a predetermined fire temperature on a fire exposed side of said door panel;
said door jamb being configured to enclose at least: the upper edge of said door panel, and one vertical edge of said door panel;
said door panel comprising:
a metal frame;
a pair of glass panes supported by said metal frame;
said pair of glass panes comprising a first glass pane with an outer surface and an inner surface, and a second glass pane with an outer surface and an inner surface;
said inner surfaces of said first and second glass panes facing towards one another;
said outer surfaces of said first and second glass panes facing away from one another;
said first and second glass panes forming a space between them;
said first and second glass panes each comprising a peripheral portion;
each peripheral portion of said first and second glass panes comprising an edge portion;
said first and second glass panes being disposed to extend substantially fully to said peripheral portion of said door panel;
said metal frame comprising a profile structure to hold and retain said first and second glass panes;
said profile structure comprising first and second securing portions;
said first and second securing portions each being configured to secure said first and second glass panes;

said first and second securing portions each comprising an outer portion disposed in the same plane as each outer surface of said first and second glass panes;

said profile structure further comprising an inner portion extending between said first and second glass panes a predetermined distance towards said central portion of said door panel; and an enamel layer being disposed substantially solely over each peripheral portion of each glass pane to provide an enamel covered portion on each glass pane and a portion not covered by enamel on each glass pane;

the portion not covered by enamel of each glass pane extending over a substantial portion of each glass pane;

each outer portion of said first and second securing portions being substantially smaller than each enamel covered portion of each glass pane;

each enamel layer being disposed on the inner surface of each glass pane;

each enamel layer being configured to conceal just said inner portion of said profile structure from sight;

each enamel layer being configured to provide said door panel on both sides thereof with an appearance that said door panel comprises solely glass from said central portion to said peripheral portion of said door panel; and a transparent fireproofing substance being disposed in said space between said first and second glass panes.

2. The fire rated door assembly according to claim 1, wherein:

said profile structure comprises a hollow structure;

said hollow structure comprising at least a first cavity and a second cavity;

said first cavity having a wall;

said wall comprising a portion configured to connect at least one additional profile element to said profile structure.

3. The fire rated door assembly according to claim 2, wherein:

said door panel comprises a door panel of one of: a single-panel side-hung swinging door, a double-panel side-hung swinging door, a single-panel swinging door, and a double-panel swinging door;

said first and second glass panes comprising a safety glass; and said fireproofing substance comprising a fireproofing gel.

4. The fire rated panel in accordance with claim 3, comprising at least one of:

said outer portions of said profile structure comprise portions configured to cover said edge portions of said first and second glass pane;

said profile structure comprising a first edge profile facing away from said inner portion of said profile structure;

said first edge profile comprising a pair of leg portions;

said edge portions of said first and second glass panes comprising recessed step portions;

said recessed step portions being configured to be accepted between corresponding leg portions of said first edge profile and said inner portion of said profile structure;

both said first glass pane and said second glass pane comprise beveled edge portions adjacent said edge portions of said first and second glass panes;

a second edge profile;

said second edge profile comprising leg portions;

said beveled edge portions being covered by said leg portions of said second edge profile;

said first edge profile being configured to have a transverse cross-section;

said cross-section comprising one of: a crown cross-section, a spherical cross-section, a curved cross-section, and a planar cross-section;

said first edge profile comprises a T-shaped groove; and a seal structure being disposed in said T-shaped groove;

said seal structure being configured to coact with an adjacent structure;

said first edge profile comprises at least one portion to secure at least one fireproof intumescent material;

said intumescent material being a material to intumesce at a predetermined temperature;

said at least one additional profile element is attached to said profile structure;

said at least one additional profile element comprising leg portions configured to cover said recessed step portions of said first and said second glass panes;

said at least one additional profile element being configured with T-shaped groove portions;

said T-shaped groove portions being configured to accept one of: a stop profile, and a seal;

said profile structure comprising at least one of: plastic, fiberglass-reinforced plastic, steel, wood, and a light alloy; and said profile structure being configured to accept at least one of: hardware, and fittings;

said profile structure comprises a tubular structure;

said tubular structure comprising a single cavity and an outer boundary leg portion;

said outer boundary leg portion comprising projecting portions configured to cover at least part of said edge portions of said first and said second glass panes.

5. In a fire rated door assembly that gives an architectural glazing construction appearance, said door assembly comprising: a door jamb; said door jamb comprising a material to provide said door jamb with a fire rating and thus with the capability to withstand fire for a predetermined time with a predetermined fire temperature on a fire exposed side of said door jamb; a door panel; said door panel being configured to be mounted at said door jamb and to open and to close; said door panel being configured with a peripheral portion adjacent to said jamb and a floor, and a central portion; said peripheral portion of said door panel comprising peripheral edges adjacent said door jamb; said door panel comprising a material to provide said door panel with a fire rating and thus with the capability to withstand fire for a predetermined time with a predetermined fire temperature on a fire exposed side of said door panel; said door jamb being configured to enclose at least: the upper edge of said door panel, and one vertical edge of said door panel;

said door panel comprising:

a frame;

a pair of glass panes supported by said frame;

said pair of glass panes comprising a first glass pane with an outer surface and an inner surface, and a second glass pane with an outer surface and an inner surface;

said inner surfaces of said first and second glass panes facing towards one another;

said outer surfaces of said first and second glass panes facing away from one another;

said first and second glass panes forming a space between them;

said first and second glass panes each comprising a peripheral portion;

each peripheral portion of said first and second glass panes comprising an edge portion;

said first and second glass panes being disposed to extend substantially fully to said peripheral portion of said door panel;

said frame comprising a profile structure to hold and retain said first and second glass panes;

said profile structure comprising first and second securing portions;

said first and second securing portions each being configured to secure said first and second glass panes at the respective edge portion of each glass pane;

said first and second securing portions each comprising an outer portion disposed in the same plane as each outer surface of said first and second glass panes;

said profile structure further comprising an inner portion extending between said first and second glass panes a predetermined distance towards said central portion of said door panel; and a layer being disposed over each peripheral portion of each glass pane to provide a portion covered by a layer on each glass pane and a portion not covered on each glass pane;

each layer being configured and disposed to conceal said inner portion of said profile structure from sight;

each portion of said first and second securing portions being substantially smaller than each portion covered by a layer of each glass pane;

each layer being disposed on the inner surface of each glass pane;

each layer being configured to provide said door panel on both sides thereof with an appearance that said door panel comprises solely glass from said central portion to said peripheral edges of said door panel; and a transparent fireproofing substance being contained in said space between said first and second glass panes.

6. In the fire rated door assembly according to claim 5, wherein:

said profile structure comprises a hollow structure;

said hollow structure comprising at least a first cavity and a second cavity;

said first cavity having a wall;

said wall comprising a portion configured to connect at least one additional profile element to said profile structure.

7. A fire rated panel, such as a fire rated door panel or a fire rated window panel, said panel comprising:

a frame;

a pair of glass panes supported by said frame;

said pair of glass panes comprising a first glass pane with an outer surface and an inner surface, and a second glass pane with an outer surface and an inner surface;

said inner surfaces of said first and second glass panes facing towards one another;

said outer surfaces of said first and second glass panes facing away from one another;

said first and second glass panes forming a space between them;

said first and second glass panes each comprising a peripheral portion;

each peripheral portion of said first and second glass panes comprising an edge portion;

said frame comprising a peripheral portion;

said first and second glass panes being disposed to extend substantially fully to said peripheral portion of said frame;

said frame comprising a profile structure to hold and retain said first and second glass panes;

said profile structure comprising first and second securing portions;

said first and second securing portions each being configured to secure said first and second glass panes at the respective edge portion of each glass pane;

said first and second securing portions each comprising an outer portion disposed in the same plane as each outer surface of said first and second glass panes;

said profile structure further comprising an inner portion extending between said first and second glass panes a predetermined distance towards said central portion of said panel; and a layer being disposed over each peripheral portion of each glass pane to provide a portion covered by a layer and being configured to conceal said inner portion of said profile structure from sight;

each outer portion of said first and second securing portions being substantially smaller than each portion covered by a layer of each glass pane;

each layer being disposed on the inner surface of each glass pane;

each layer being configured to provide said panel on both sides thereof with an appearance that said panel comprises solely glass from its central portion to its peripheral portion; and a transparent fireproofing substance being disposed in said space between said first and second glass panes.

8. The fire rated panel according to claim 7, wherein:

said profile structure comprises a hollow structure;

said hollow structure comprising at least a first cavity and a second cavity;

said first cavity having a wall;

said wall comprising a portion configured to connect at least one additional profile element to said profile structure.

9. The fire rated panel in accordance with claim 8, wherein:

said outer portions of said profile structure comprise portions configured to cover said edge portions of said first and second glass pane.

10. The fire rated panel in accordance with claim 9, wherein:

said profile structure comprising a first edge profile facing away from said inner portion of said profile structure;

said first edge profile comprising a pair of leg portions;

said edge portions of said first and second glass panes comprising recessed step portions;

said recessed step portions being configured to be accepted between corresponding leg portions of said first edge profile and said inner portion of said profile structure.

11. The fire rated panel in accordance with claim 9, wherein:

both said first glass pane and said second glass pane comprise beveled edge portions adjacent to said edge portions of said first and second glass panes;

a second edge profile;

said second edge profile comprising leg portions;

said beveled edge portions being covered by said leg portions of said second edge profile.

12. The fire rated panel in accordance with claim 10, wherein:

said first edge profile being configured to have a transverse cross-section;

said cross-section comprising one of: a crown cross-section, a spherical cross-section, a curved cross-section, and a planar cross-section.

13. The fire rated panel in accordance with claim 12, wherein:

said first edge profile comprises a T-shaped groove; and a seal structure being disposed in said T-shaped groove;

said seal structure being configured to coact with an adjacent structure.

14. The fire rated panel in accordance with claim 13, wherein:

said first edge profile comprises at least one portion to secure at least one fireproof intumescent material;

said intumescent material being a material to intumesce at a predetermined temperature.

15. The fire rated panel in accordance with claim 14, wherein:

said at least one additional profile element is attached to said profile structure;

said at least one additional profile element comprising leg portions configured to cover said recessed step portions of said first and said second glass panes;

said at least one additional profile element being configured with T-shaped groove portions;

said T-shaped groove portions being configured to accept one of: a stop profile, and a seal; and said profile structure comprising at least one of: plastic, fiberglass-reinforced plastic, steel, wood, and a light alloy; and said profile structure being configured to accept at least one of: hardware, and fittings.

16. The fire rated panel in accordance with claim 7, wherein:

said profile structure comprises a tubular structure;

said tubular structure comprising a single cavity and an outer boundary leg portion;

said outer boundary leg portion comprising projecting portions configured to cover at least part of said edge portions of said first and said second glass panes.

17. The fire rated panel in accordance with claim 8, comprising at least one of:

said outer portions of said profile structure comprise portions configured to cover said edge portions of said first and second glass pane;

said profile structure comprising a first edge profile facing away from said inner portion of said profile structure;

said first edge profile comprising a pair of leg portions;

said edge portions of said first and second glass panes comprising recessed step portions;

said recessed step portions being configured to be accepted between corresponding leg portions of said first edge profile and said inner portion of said profile structure;

both said first glass pane and said second glass pane comprise beveled edge portions adjacent said edge portions of said first and second glass panes;

a second edge profile;

said second edge profile comprising leg portions;

said beveled edge portions being covered by said leg portions of said second edge profile;

said first edge profile being configured to have a transverse cross-section;

said cross-section comprising one of: a crown cross-section, a spherical cross-section, a curved cross-section, and a planar cross-section;

said first edge profile comprises a T-shaped groove; and a seal structure being disposed in said T-shaped groove;

said seal structure being configured to coact with an adjacent structure;

said first edge profile comprises at least one portion to secure at least one fireproof intumescent material;

said intumescent material being a material to intumesce at a predetermined temperature;

said at least one additional profile element is attached to said profile structure;

said at least one additional profile element comprising leg portions configured to cover said recessed step portions of said first and said second glass panes;

said at least one additional profile element being configured with T-shaped groove portions;

said T-shaped groove portions being configured to accept one of: a stop profile, and a seal; and said profile structure comprising at least one of: plastic, fiberglass-reinforced plastic, steel, wood, and a light alloy;

said profile structure comprises a tubular structure;

said tubular structure comprising a single cavity and an outer boundary leg portion;

said outer boundary leg portion comprising projecting portions configured to cover at least part of said edge portions of said first and said second glass panes.

* * * * *

UNITED STATES PATENT AND TRADEMARK OFFICE
CERTIFICATE OF CORRECTION

PATENT NO. : 6,668,499 B2  
DATED : December 30, 2003  
INVENTOR(S) : Walter Degelsegger Page 1 of 1

It is certified that error appears in the above-identified patent and that said Letters Patent is hereby corrected as shown below:

Column 1,  
Line 4, after "No.", delete "PCT/EP00/060884," and insert -- PCT/EP00/06884, --.  
Line 34, after "stability" insert -- . --  
Line 52, after "a", delete "tire," and insert -- fire, --.

Column 2,  
Line 24, after "glass", delete "panels" and insert -- panes --.

Column 3,  
Line 31, after "these" delete "invention" and insert -- inventions --.

Column 4,  
Line 30, after "specifically", delete "am" and insert -- as --.

Column 6,  
Line 3, after "(44)," delete "g".

Column 7,  
Line 14, after "Application", delete "PCT/EP00/06898," and insert -- PCT/EP00/06888, --.  
Line 29, after "corresponding", delete "case" and insert -- cases --.

Column 8,  
Line 26, after "retardant", delete "resia" and insert -- resin --.

Column 9,  
Line 65, after "1999", delete "a" and insert -- and --.

Signed and Sealed this

Fifteenth Day of June, 2004

JON W. DUDAS  
*Acting Director of the United States Patent and Trademark Office*